United States Patent Office 3,272,773
Patented Sept. 13, 1966

3,272,773
PROCESS OF PRODUCING STABILIZED POLYCARBONAMIDES CONTAINING A METAL CHELATE OF 8-HYDROXYQUINOLINE
David Holmes Edison, Signal Mountain, Tenn., assignor to E. I. du Pont de Nemours and Company, Wilmington, Del., a corporation of Delaware
No Drawing. Filed Oct. 1, 1962, Ser. No. 227,572
3 Claims. (Cl. 260—45.75)

This invention relates to improved polycarbonamides, to methods for their preparation, and more particularly to improvement in the preparation of fibers, filaments and yarns (generically embraced hereinafter in the term filaments) from polycarbonamides modified for enhanced resistance to atmospheric degradation.

The polycarbonamide synthetic resins have many valuable properties that have resulted in their well known widespread use in industry and in the arts. Methods of their preparation and examples of their many uses are described in U.S. Patents 2,071,250, 2,071,253, 2,130,948 and 2,241,322. Possibly two of the more outstanding properties of these resins which contribute to a large extent to their utility are their physical strength and unusual toughness. These properties are so superior to like properties of competitive resins that appreciable losses in the physical properties of polycarbonamides can occur over a period of time without falling to the highest level of those properties of competitive resins. However, it is well known that the polycarbonamides, in common with other organic materials, are subject to various degradation reactions upon exposure to extreme atmospheric conditions, and a number of methods have been proposed for stabilizing polycarbonamides against such exposure, particularly exposure to heat and light. One successful method of stabilization is provided in French Patent 906,893, which teaches that an improved polycarbonamide may be prepared by incorporating in the polymer a small amount of a copper salt such as copper acetate. This method of stabilization is further amplified in U.S. Patent 2,705,227, where it is disclosed that the stabilizing effect of copper compounds is greatly enhanced by adding an inorganic halide such as potassium iodide along with the copper compound.

Polycarbonamides modified by the presence of small amounts of copper compounds have been found to exhibit a remarkable resistance to degradation upon exposure to various atmospheric conditions, particularly exposure to high temperatures. However, in the preparation of textile filaments from these polycarbonamides, where the molten polymer is forced through a sand pack for filtration purposes and then extruded through a spinneret to form filaments which are subsequently quenched and processed into fibers, it has been found that the presence of copper compounds leads to a gradual plugging or "loading" of the sand pack which eventually results in complete inoperability of the spinning equipment. It is now recognized that cupric ions react with polycarbonamides, presumably with the free carboxyl groups present in the polymer, in such a manner that the ions are reduced to metallic copper particles which are insoluble in the polymer and which agglomerate to form particles of sufficient size to be filtered out in the sand pack. During spinning, the concentration of metallic copper particles in the sand pack gradually increases, filling up the interstices of the filtering bed and thereby impeding the flow of polymer. Eventually the pressure in the system mounts until it reaches a point at which a joint or a gasket gives way and a leak is developed which requires that the spinning equipment be shut down for cleaning purposes. The plugging of sand packs by the deposition of metallic copper particles has been found to be particularly troublesome when the polycarbonamide is prepared either wholly or in part from an aromatic carboxylic acid. This invention is concerned with a method of overcoming this problem.

It is an object of this invention to provide synthetic polycarbonamide filaments stabilized against atmospheric degradation, particularly against embrittlement and loss of strength upon exposure to elevated temperatures. It is a further object of this invention to provide synthetic high molecular weight polycarbonamides containing a copper compound which is resistant to reaction with molten polymer to produce metallic copper particles. A still further object is the provision of a method for melt spinning synthetic polycarbonamide fibers and filaments containing metal organic compounds, which method exhibits improved sand pack life. Further objects will be apparent from the following description of the invention.

It has now been found that stabilized filaments may be melt-spun from polycarbonamides containing metal organic compounds without excessive pack "loading" or plugging, if the metal organic compound is a metal chelate, prepared from an organic chelating agent, which is highly resistant to ionic reactions while at the same time allowing the metal to undergo free radical reactions. Therefore, the objects of this invention are accomplished by incorporating in a polycarbonamide during the polymerization reaction, or at any time prior to melt spinning, a metal chelate formed from an organic chelating agent which gives a neutral molecule soluble in polycarbonamides, stable in molten polycarbonamides, insoluble in water to the extent that it is not extracted upon treatmen of he polycarbonamide with boiling water, resistant to reaction with free carboxyl groups at elevated temperatures, and yet capable of undergoing free radical reactions of the type exhibited by simple metal organic compounds. The polycarbonamide containing such a metal chelate is melt-spun and drawn by conventional procedures to produce fibers and yarns of exceptional resistance to heat and light degradation.

It has been found necessary to use pre-formed metal chelates to achieve the purposes of this invention. Attempts to prepare metal chelate compounds in situ by adding to the polymerization reaction mass or to the polycarbonamide itself various precursors of the desired compound have been found unsatisfactory.

In an important embodiment of the invention, the objects of the invention are accomplished by the incorporation in a polycarbonamide during the polymerization reaction, or in subsequent treatment steps prior to melt-spinning, the metal chelate formed from cupric ions and 8 - hydroxyquinoline. Cupric 8 - hydroxyquinolate not only gives the protection against degradation shown by simpler copper compounds such as copper acetate, but also shows a greatly reduced ionic reaction with the carboxyl groups present in the polymer, with the result that the precipitation of metallic copper particles is markedly retarded. The use of cupric 8 - hydroxyquinolate, with an alkali halide such as potassium iodide if desired, allows the melt spinning of stabilized filaments without excessive sand pack loading.

The copper 8-hydroxyquinolate should be added to the polycarbonamide in an amount which is at least 0.005% by weight of the polymer. Preferably, the concentration should be at least 0.025%, with further improvement being obtained with concentrations as high at 0.5%. In some instances higher concentrations, i.e., at high at 1%, may be desired.

The addition of cupric 8-hydroxyquinolate to the polycarbonamide requires no change in the process of polymerizing the polymer nor in the spinning and drawing procedures for preparing yarn from the polymer.

The invention is further illustrated by the following examples which are not intended to be limitative. Parts mentioned are by weight.

EXAMPLE I 12,000 parts of a 48% aqueous solution of hexamethylene diammonium adipate (66 nylon salt) and 17.8 parts of a 25% aqueous acetic acid solution (a viscosity stabilizer; 0.3 mol-percent based on the quantity of the 66 salt) are charged to an evaporator and stirred while adding 9.1 parts of a 20% aqueous dispersion of the copper (II) complex of 8-hydroxyquinoline (referred to below as "Cu-8HQ"; the quantity mentioned gives 0.036% by weight of the complex with reference to the weight of the polymer, and this in turn is equivalent to 66 parts per million of copper). 16.2 parts of sodium iodide is also added (to give a concentration of 0.3% based on the weight of the polymer). The mixture is then concentrated to 60% solids by evaporation at atmospheric pressure and is transferred to an autoclave equipped with stirrer, where it is heated in the closed vessel until the steam pressure reaches 250 lbs. per sq. inch (temperature 210° C.) over a period of about 20 minutes. The autoclave stirrer is then started. Heating is continued, the temperature increasing, while maintaining a pressure of 250 lbs. by bleeding off steam. When the temperature reaches 240° C., steam is bled off more rapidly, reducing the pressure continuously over about 90 minutes to atmospheric pressure.

Heating at atmospheric pressure is continued at about 275° C. to complete the polymerization. The autoclave is discharged by extruding the molten polymer as a ribbon through a narrow slit at 100 lbs. pressure of inert gas. The ribbon is quenched on a water-cooled casting wheel and cut to flake. The polymer flake has a relative viscosity of 60. (Relative viscosity defined in U.S. 2,385,890.) The flake has the characteristic greenish-yellow color of the copper (II) complex of 8-hydroxyquinoline, indicating that the copper complex is still present in the polymer in its original form.

The 66 polymer flake thus prepared is remelted in a screw extruder and supplied to a conventional spinning apparatus fitted with a metering pump, sand pack and spinneret assembly, as described by Graves in U.S. 2,266,368. At the spinning position, upstream from the sand pack, the 66 polymer is mixed with molten polyhexamethylene isophthalamide (6I) in a 4 to 1 mol ratio. The block copolymer formed is forced through the sand pack and spinneret where it is extruded as a 140-filament yarn.

In an actual series of tests run according to the above procedure, a pressure gauge was installed between metering pump and sand pack to continuously record the pressure build-up caused by the loading of the sand pack with insoluble particles. The rate of pressure rise observed in two separate experimental runs is recorded in Table I below.

For comparison, the above procedure was repeated with the exception that to the 66 polymer was added a conventional antioxidant formula, that is 0.02 mol percent copper acetate monohydrate and 0.2% potassium iodide, instead of the copper complex of 8-hydroxyquinoline and sodium iodide described above. The rate of pressure rise observed in the spinning assembly is likewise recorded in Table I below.

*Table I*

| Run Number | Additive | Total Spinning Time, Hours | Initial Pressure, p.s.i. | Rate of Pressure Rise, p.s.i. per Hr. |
|---|---|---|---|---|
| 1 | Cu-8HQ | 31.7 | 5,400 | Below 10. |
| 2 | Cu-8HQ | 27.5 | 6,100 | Do. |
| 3 | Cu(OAc)₂ | 29 | 6,000 | 55. |

The data in the table clearly show the improved performance afforded by the present invention.

EXAMPLE II

Polyhexamethylene adipamide containing 0.036% by weight of the copper complex of 8-hydroxyquinoline and 0.3% sodium iodide is prepared as described in Example I, and melt spun and drawn by conventional procedures to provide an 840-denier, 136-filament yarn for testing purposes. The yarn produced has the characteristic greenish-yellow color of cupric 8-hydroxyquinolate.

In an actual test, a similar yarn containing 0.02% cupric acetate and 0.2% sodium iodide was prepared for comparison. A control yarn containing no copper compound was also prepared.

The three yarns described above were tested for resistance to heat degradation by exposing skeins of the yarn, in relaxed form, to air at 180° C. in an oven for various lengths of time and measuring the change in breaking strength. The results of these tests are summarized in Table II below.

*Table II*

| Test No. | Polymer Additive | Tenacity in grams per denier | Elongation in percent | Percent of original breaking strength retained after heating for t hours at 180° C. | | | |
|---|---|---|---|---|---|---|---|
| | | | | t=2 | 4 | 8 | 24 |
| 1 | Cu-8HQ | 8.3 | 15.6 | 97 | 95 | 94 | 89 |
| 2 | Cu(OAc)₂ | 7.1 | 17.5 | 95 | 96 | 93 | 86 |
| 3 | None | 8.6 | 17.1 | 50 | 45 | 42 | 35 |

From an inspection of the data in the table it is obvious that the copper complex of 8-hydroxyquinoline is at least as effective as copper acetate in stabilizing polyamides against heat degradation.

Substantially equivalent results are obtained when the copper compounds tested above are incorporated in poly-ε-caproamide.

EXAMPLE III 66 nylon polymer containing 0.036% of the copper complex of 8-hydroxyquinoline and 0.3% sodium iodide is prepared as described in Example I and melt spun from a twin piston press spinner along with polyhexamethylene isophthalamide (6I) containing no copper. The press spinner is so constructed that the two molten polymers are brought together in a 4:1 mol ratio immediately above the spinneret, mixed, and extruded into air. The extruded polymer is examined for insoluble particles by preparing a 5% solution of the polymer in formic acid and counting the number of particles in a 2000 microliter sample with the assistance of a Coulter counter (U.S.P. 2,656,-508). The particle count is shown in Table III below.

In an actual series of tests, the experiment was repeated (a) using 66 nylon polymer containing 0.020% copper acetate and 0.2% potassium iodide; (b) with no additive at all in the 66 nylon; and (c) with 0.3% sodium iodide as the only additive. The particle counts for these several polymers are also shown in Table III.

*Table III*

| Polymer Additive | Particle Count, Number of particles larger than | | |
|---|---|---|---|
| | 20 microns | 10 microns | 5 microns |
| Cu-8HQ | 119 | 2,200 | 17,000 |
| Cu(OAc)₂ | 1,100 | 7,600 | 39,000 |
| Sodium iodide | 117 | 2,700 | 21,000 |
| None | 110 | 1,000 | 14,000 |

The data in this table clearly indicate the superiority of copper 8-hydroxyquinolate over copper acetate in reducing the formation of insoluble particles in polycarbonamides.

The excellent results achieved with cupric 8-hydroxyquinolate are also obtained when the 8-hydroxyquinoline molecule carries various substituents on the aromatic rings, provided that there are no substituents in positions 2,7 of the quinoline radical, that is, the positions ortho to the ring nitrogen atom or to the hydroxyl group.

Altogether, any 8-hydroxyquinoline metal complex is fit for use in this invention provided it satisfies the following conditions:

(1) The 8-hydroxyquinoline radical must have no substituents (other than H) in the 2,7-positions.

(2) The complex must be stable at the temperature of the spinning melt. This usually runs in the range of 270° to 295° C., but may in some instances be as high as 310° C. Therefore, a complex which is stable at 295° C. will generally be suitable for the great majority of polycarbonamides.

(3) The complex must be soluble in the intended molten polycarbonamide to an extent of at least 50 p.p.m. by weight.

In addition to the copper complex of 8-hydroxyquinoline, already mentioned, the following compounds, available in the literature, are believed to satisfy the aforegoing conditions:

3-chloro-8-hydroxyquinoline,
6-methyl-8-hydroxyquinoline,
5-phenyl-8-hydroxyquinoline,
6-butoxy-8-hydroxyquinoline, and
5-cyano-8-hydroxyquinoline.

Although the examples illustrate the invention with the copper (II) complex of 8-hydroxyquinoline, it is clear that the principles of this invention will apply equally well to other metals known to have stabilizing properties for polycarbonamides. Among such other metals may be named $Mn^{II}$, $Sn^{IV}$, $Cr^{III}$, $Ni^{II}$, $Pb^{II}$, $UO_2^{II}$, $Zn^{II}$, $Al^{III}$, and $Co^{II}$.

Various methods of introducing the pre-formed metal complex into the polycarbonamide will be readily apparent to those skilled in the art. One method which has given highly satisfactory results involves the addition of an aqueous slurry of the metal complex to the amine-acid salt solution prior to the start of the polymerization procedure. It is usually desirable to use a dispersing agent in the preparation of such a slurry, to stabilize the dispersion and to assist in the smooth mixing of slurry and amine salt solution. Many commercially available dispersing agents are satisfactory for this purpose including, for example, the sodium and potassium salts of alkyl naphthalene sulfonic acids. Slurries of cupric 8-hydroxyquinolate prepared in a Waring Blendor with 2 to 3% of a commercial Na-salt of a polymerized alkylated arenesulfonic acid; Kirk-Othmer, Enc. of Chem. Techn., vol. 13, page 515, based on weight of copper complex, have given excellent results.

As concerns the polyamide, this invention is not limited to the particular polycarbonamides named in the above examples, but may be applied generally to any synthetic linear polymer having recurring units of the formula

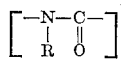

as integral parts of the main polymer chain, wherein R is hydrogen or a monovalent hydrocarbon radical, the average number of carbon atoms separating the amide groups being at least two, said polycarbonamide having an intrinsic viscosity of at least about 0.4, as defined in U.S. Patent 2,130,948. Particular polycarbonamides included among those which are useful in this invention are as follows: polyhexamethylene adipamide, polyhexamethylene sebacamide, polymerized 6-aminocaproic acid, polytetramethylene sebacamide, polytetramethylene adipamide, polymetaxylylene adipamide, the polyamide from bis(4-aminocyclohexyl)methane and azelaic acid, sebacic acid or decamethylene-1,10-dicarboxylic acid, and the polyamide from 2-methylhexamethylene diamine and terephthalic acid. The invention is also applicable to various copolymers, either block or random, such as the copolymer of polyhexamethylene adipamide and polyhexamethylene isophthalamide, and the copolymer of polyhexamethylene adipamide and polyhexamethylene t-butyl-isophthalamide.

It will be noted that in Examples I and III above, the polycarbonamide consisted of a mixture of 66-nylon (from hexamethylene diamine and adipic acid) and 6I-nylon (from the same diamine but isophthalic acid). The use of such mixtures is not a limitation upon this invention. These examples represent actual tests which have been run in the laboratory, and the object of admixing the 6I constituent was to test this invention under highly adverse conditions, it being noted here that 6I-nylon is particularly prone to precipitate free copper from copper acetate, thereby causing rapid clogging of the sand pack. The said examples demonstrate that the invention successfully withstood the severity of the test.

In all the examples above, sodium iodide was also added to the melt, this feature representing simply the improvement of Stamatoff, U.S.P. 2,705,227, according to which the stability of polyamides against atmospheric degradation at elevated temperatures can be greatly enhanced by treating the melt with an organic copper compound in conjunction with an inorganic halide, such as the chloride, bromide or iodide of sodium, potassium, magnesium or ammonium. This feature, however, again is not essential to the instant invention. The inorganic halide may be omitted if a lower degree of heat-stabilization is acceptable for the product aimed at in a particular case. Insofar as diminishing the clogging propensity of the sand pack is concerned, improvement is achieved whether inorganic halides are used or not. On the other hand, if used, any of the halides indicated by Stamatoff are suitable for this invention, and they may be added in the quantities indicated by said patentee, that is, in quantities ranging from 0.1 to 5% by weight based on the weight of the melt.

The compositions of this invention may also be modified by the addition of other materials conventionally added in the preparation of fibers and filaments from polycarbonamides. Suitable modifying agents include plasticizers, antistatic agents, fillers, and certain pigments such as titanium dioxide. The stabilized polycarbonamides of this invention may be converted into any of the forms suitable for polyamides generally, such as yarns, tire cord, bristles, fabric, ropes and hawsers, textiles, nonwoven fibrous structures, and many other useful structures. They are especially valuable in those uses in which the polycarbonamide structure encounters high temperatures, particularly under oxidative conditions.

While the foregoing descriptions have been made with respect to specific embodiments of the present invention, it is to be understood that changes and modifications may be made without departing from the spirit and scope of the invention as defined in the appended claims.

I claim as my invention:

1. In a process of spinning yarn from a molten synthetic polycarbonamide which has been filtered through a sand pack, the improvement which consists of incorporating in said melt in an amount of at least 0.005% based on the weight of said polycarbonamide, at a point upstream from said sand pack, a metal chelate of an 8-hydroxyquinoline which is stable at the temperature of said melt, whereby to produce a yarn of improved durability to heating in open air without cumulatively plugging said sand pack by deposition of metal particles as the melt passes through it.

2. In a process as defined in claim 1, the improvement which consists of adding to said melt (a) the copper complex of 8-hydroxyquinoline and (b) potassium iodide, both of those agents being added to said melt at a point upstream from said sand pack, said copper complex being present in an amount of at least 0.005% by weight and said potassium iodide being present in an amount between about 0.1 and 5% by weight.

3. In a process of spinning yarn from a molten synthetic polycarbonamide which is filtered through a sand pack, the improvement which consists of incorporating the copper chelate of 8-hydroxyquinoline in said melt in an amount of at least 0.005% based on the weight of said polycarbonamide, at a point upstream from said sand pack, whereby to produce a yarn of improved durability to heating in open air without cumulatively plugging said sand pack by deposition of copper particles as the melt passes through it.

References Cited by the Examiner

UNITED STATES PATENTS

| | | | |
|---|---|---|---|
| 2,266,368 | 12/1941 | Hull et al. | 210—266 |
| 2,705,227 | 3/1955 | Stamatoff | 260—45.75 |
| 2,790,734 | 4/1957 | Kuhn et al. | 260—45.75 |

OTHER REFERENCES

Clark, W. A., et al.: "The Development and Application of Copper 8-Quinolinolate as an Industrial Preservative," Proceedings of the Chemical Specialities Manufacturers Association, Inc., 38th, December 1951, pages 55–60.

Ishishima, Kimi: "Anti-Mildew Effect From the Two Bath Method of Using 8-Quinolinol and Copper Acetate," Kasei-Gakee Zassli, 10, pages 205–9 (1959), abstracted in Chemical Abstracts, vol. 54, page 11491(f).

Miles, T., et al.: "Paper Chromatograph Method for the Quantitative Determination of Copper and Zinc 8-Quinolinolates," Analytical Chemistry 33 (6), pages 685–7, May 1961.

LEON J. BERCOVITZ, *Primary Examiner.*

DONALD E. CZAJA, *Examiner.*

G. W. RAUCHFUSS, JR., *Assistant Examiner.*